US010139258B1

(12) United States Patent
Tokhtuev et al.

(10) Patent No.: US 10,139,258 B1
(45) Date of Patent: Nov. 27, 2018

(54) FLUID FLOW METER WITH NORMALIZED OUTPUT

(71) Applicant: Ecolab USA Inc., St. Paul, MN (US)

(72) Inventors: Eugene Tokhtuev, Duluth, MN (US); Paul S. Schilling, Duluth, MN (US)

(73) Assignee: Ecolab USA Inc., St. Paul, MN (US)

( * ) Notice: Subject to any disclaimer, the term of this patent is extended or adjusted under 35 U.S.C. 154(b) by 0 days.

(21) Appl. No.: 15/658,437

(22) Filed: Jul. 25, 2017

(51) Int. Cl.
*G01F 3/24* (2006.01)

(52) U.S. Cl.
CPC ........................... *G01F 3/24* (2013.01)

(58) Field of Classification Search
CPC .............. G01F 1/08; G01F 15/00; G01F 3/04
See application file for complete search history.

(56) References Cited

U.S. PATENT DOCUMENTS

| | | | |
|---|---|---|---|
| 3,779,457 A | 12/1973 | Lynas et al. | |
| 3,910,112 A | 10/1975 | Gerlach et al. | |
| 4,240,294 A | 12/1980 | Grande | |
| 4,328,549 A | 5/1982 | Avery | |
| 4,829,808 A | 5/1989 | West | |
| 4,976,137 A | 12/1990 | Decker et al. | |
| 5,014,211 A | 5/1991 | Turner et al. | |
| 5,118,008 A | 6/1992 | Williams et al. | |
| 5,275,043 A * | 1/1994 | Cotton ....................... | G01F 3/10 418/191 |
| 5,315,862 A | 5/1994 | Hasselmann | |
| 5,746,238 A | 5/1998 | Brady et al. | |
| 5,771,178 A * | 6/1998 | Stemporzewski, Jr. ..................... | B67D 7/32 137/391 |
| 5,857,589 A | 1/1999 | Cline et al. | |
| 5,895,863 A | 4/1999 | Glaudel et al. | |
| 6,383,237 B1 | 5/2002 | Langer et al. | |
| 7,034,937 B2 * | 4/2006 | Crudge ................. | G01F 1/7086 356/337 |
| 7,177,780 B2 | 2/2007 | Hillam et al. | |
| 7,523,660 B2 * | 4/2009 | Albrecht ................... | G01F 3/10 73/261 |
| 8,069,719 B2 | 12/2011 | Tokhtuev et al. | |

(Continued)

FOREIGN PATENT DOCUMENTS

| | | |
|---|---|---|
| CA | 2859228 A1 | 2/2016 |
| CN | 202188872 U | 4/2012 |

(Continued)

OTHER PUBLICATIONS

Eugene Tokhtuev, U.S. Appl. No. 15/658,435, entitled "Fluid Flow Meter With Linearization," filed Jul. 25, 2017, 36 pages.

(Continued)

*Primary Examiner* — Jewel V Dowtin
(74) *Attorney, Agent, or Firm* — Fredrikson & Byron, P.A.

(57) ABSTRACT

A fluid flow meter is described, that includes intermeshing gears that may rotate synchronously. The fluid flow meter may produce a pulsed output that can be normalized to suitable values according to a method of normalizing input pulses generated in response to the rotation of gears. A volume counter can be incremented by an amount equal to a volume per input pulse each time an input pulse is generated. When the volume counter exceeds a first reference volume, a normalized output pulse can be generated until the volume counter exceeds a second reference volume.

19 Claims, 8 Drawing Sheets

(56) References Cited

U.S. PATENT DOCUMENTS

| | | | |
|---|---|---|---|
| 8,166,828 B2 | 5/2012 | Skirda et al. | |
| 8,590,362 B2 | 11/2013 | Carbone, II et al. | |
| 8,742,883 B2 * | 6/2014 | Pelkey | G05B 23/0224 |
| | | | 340/3.1 |
| 8,943,901 B2 | 2/2015 | Tokhtuev et al. | |
| 9,051,163 B2 | 6/2015 | Mehus et al. | |
| 9,383,235 B2 * | 7/2016 | Tokhtuev | G01F 1/06 |
| 2008/0295568 A1 | 12/2008 | Nanaji et al. | |
| 2009/0314115 A1 | 12/2009 | Breeser | |
| 2011/0031272 A1 | 2/2011 | Comiskey et al. | |
| 2011/0308888 A1 | 12/2011 | Carothers et al. | |
| 2012/0047988 A1 | 3/2012 | Mehus et al. | |
| 2013/0092704 A1 | 4/2013 | Tincher et al. | |
| 2013/0192678 A1 | 8/2013 | Hammonds | |
| 2014/0034668 A1 | 2/2014 | Carbone, II et al. | |
| 2014/0318639 A1 | 10/2014 | Peret et al. | |
| 2016/0258790 A1 * | 9/2016 | Tokhtuev | G01F 1/065 |

FOREIGN PATENT DOCUMENTS

| | | |
|---|---|---|
| CN | 202734883 U | 2/2013 |
| DE | 102008008427 B3 | 11/2009 |
| EP | 2793977 B1 | 11/2015 |
| GB | 1384789 A | 2/1975 |
| GB | 2120792 A | 12/1983 |
| GB | 2177802 A | 1/1987 |
| WO | 2012126473 A2 | 9/2012 |
| WO | 2014144557 A2 | 9/2014 |

OTHER PUBLICATIONS

Hejin Liu et al., Machine translation of the Description, Technical Field, Summary, Brief Description and Detailed Description of Chinese Patent Application No. 202188872, filed Apr. 11, 2012, 4 pages.

Josiah Firth et al., "A novel optical telemetry system applied to flowmeter networks," Flow Measurement and Instrumentation 48 (2016) pp. 15-19, Sydney, Australia.

Suzanne Shelley, "Choosing the Best Flowmeter: Here are the pros and cons of six popular flowmeter technologies," Chemical Engineering: New York, 106.7 (Jul. 1999), 13 pages.

* cited by examiner

| Current state | Next valid state |
|---|---|
| A | B |
| B | C |
| C | D |
| D | E |
| E | F |
| F | G |
| G | H |
| H | A |

FLUID FLOW METER WITH NORMALIZED OUTPUT

BACKGROUND

Positive displacement fluid measurement systems may be used to measure a flow rate or volume of a fluid or gas. For example, dispensing systems may use feedback from a positive displacement fluid meter to control the volume of fluid dispensed. Such control systems are often used in lieu of time-on controls to more accurately dispense precise amounts of fluid or gas and is commonly used in a variety of settings including, but not limited to, the industrial, healthcare, pharmaceutical and food and beverage industries. For example, a positive displacement fluid meter may be used in the manufacturing process of a drug which requires accurate measurement of two materials to be mixed into a single batch. The positive displacement fluid meter may be installed in the supply lines of the respective materials and feedback from the meters may be used to dispense the appropriate amount of each material into a blend tank to be mixed. This application of a positive displacement meter, like many others, may require the positive displacement meter to have an accuracy of measurement (e.g., +/−0.5%) to comply with quality control or regulations, for example. Accordingly, a positive displacement meter that accurately measures a volume of fluid or gas can help facilitate performing intended function of a fluid dispensing system or process.

An example fluid flow meter is described in the commonly-assigned application, U.S. Pat. No. 9,383,235, assigned to Ecolab Inc., St. Paul, Minn., the disclosure of which is hereby incorporated by reference. Manufacturers typically provide a factory calibration which correlates the volume of a pocket of fluid to a rotational count corresponding to rotation of one or more components (e.g., oval gears) in the flow mete for various volumes of flows. Thus, by counting the number of pulses produced by the fluid flow meter, the volume flow rate can be determined based on the factory calibration.

Such factory calibration may not be accurate outside of a flow range. For instance, at low flow rates near the flow minimum, the flow meter may not produce any input pulses, but may still have flow through various mechanical components of the flow meter. Similar issues may occur at operation near the flow maximum. Further, based on manufacturing tolerances, the flow rate per input pulse may be unknown for such conditions or may have non-integer values (e.g., 0.166 ml/pulse, 0.333 ml/pulse, etc.). Conventional flow meters may additionally have measurement uncertainties that may not be easily quantifiable.

SUMMARY

In one aspect, this disclosure includes a fluid flow meter, comprising a first gear intermeshing with a second gear. The intermeshing of the first gear and the second gear may permit synchronous rotation of the first gear and the second gear in response to flow of a fluid through the flow chamber. The fluid flow meter may include a flow sensor configured to generate a detection signal in response to the passage of fluid through the flow chamber and/or synchronous rotation of the first gear and the second gear. The fluid flow meter may include a controller having an input pulse generator and a normalized output pulse generator. The controller may provide a normalized pulse output based on the detected signal, and input pulses generated by the input pulse generator in response thereto.

In another aspect, a method of providing a normalized output can involve the step of providing a fluid flow meter according to any of the embodiments disclosed herein. The method can involve the step of receiving detection signals from the flow sensor at the controller. The method then involves the step of generating input pulses (for instance, using an input pulse generator) in response to the detected signal. The method then involves the step of using the controller to increment a volume counter by an amount equal to a volume per input pulse each time an input pulse is generated. When the volume counter exceeds a first reference volume, the controller then transitions a normalized output pulse generator to a state where it starts generating a normalized output pulse. When the volume counter exceeds a second reference volume, the controller transitions the normalized output pulse generator to a state where it stops generating the normalized output pulse.

In another aspect, the method can involve the step of generating input pulses using the input pulse generator when a non-integer value of volume passing through the fluid flow meter. The method can further involve the step of incrementing the volume counter by an amount equal to the non-integer value of volume passing through the flow meter when an input pulse is generated. In some such embodiments, the first reference volume is one-half of the second reference volume, and the second reference volume is a non-zero integer.

The details of one or more examples are set forth in the accompanying drawings and the description below. Other features, objects, and advantages will be apparent from the description and drawings, and from the claims.

DETAILED DESCRIPTION

Figure 1:
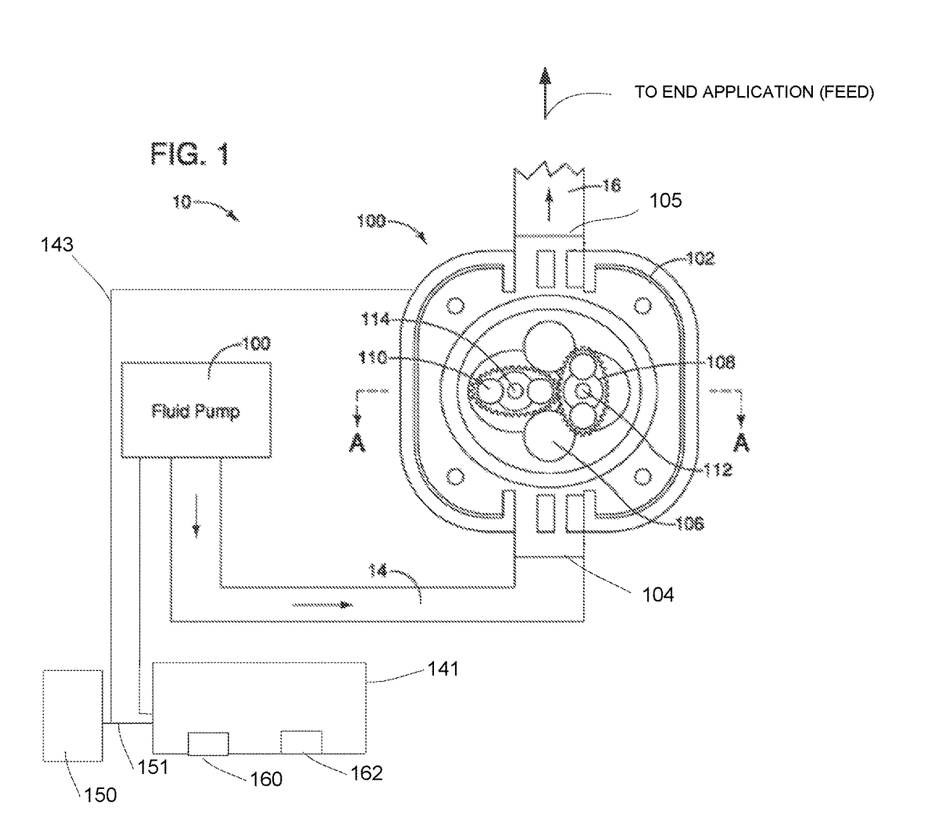
FIG. 1 is a schematic of a fluid flow meter according to an embodiment.

FIG. 1 is a top plan view of a fluid flow measurement system 10 including a fluid flow meter 100. System 10 includes a fluid pump 12, a first fluid line 14, a second fluid line 16 and a fluid flow meter 100. First fluid line 14 may be in fluid communication with fluid pump 12 configured to provide a fluid flow through system 10. Fluid pump 12 may be in fluid communication with a fluid source (not shown) and may be any suitable pump to provide a fluid flow through the system. The fluid flow may have a variety of fluid flow characteristics and may depend on the type of pump selected or the application of system 10. For example, different applications may require either a high fluid volume or a low fluid volume. Certain examples may require uniform fluid flow provided by a peristaltic pump or pressure-maintained fluid lines. In other examples, a fluid pump 12 may provide non-uniform fluid flow particularly where the application requires a low fluid volume.

Fluid flow meter 100 may be configured to measure fluid flow through system 10 and may include a housing 102 defining a chamber 106, a fluid inlet 104 and a fluid outlet 105. In the illustrated embodiment, fluid flow meter 100 is a positive displacement meter, such as an oval gear 108 flow meter. Fluid inlet 104 may be in fluid communication with first fluid line 14 and provides fluid flow from the first fluid line 14 into chamber 106. Oval gears 108 and 110 are installed within chamber 106 and are configured to rotate in concert about fixed axes of rotation 112 and 114, respectively, in response to fluid flow through the chamber 106. Fluid exits chamber 106 by way of fluid outlet 105 which is in fluid communication with second fluid line 16.

Accordingly, fluid provided by fluid pump 12 flows through fluid line 14 and into fluid flow meter 100 through fluid inlet 104. The fluid then flows through fluid flow meter 100, wherein the volume is measured, and out of the fluid flow meter 100 through fluid outlet 105 and into second fluid line 16.

Figure 2:
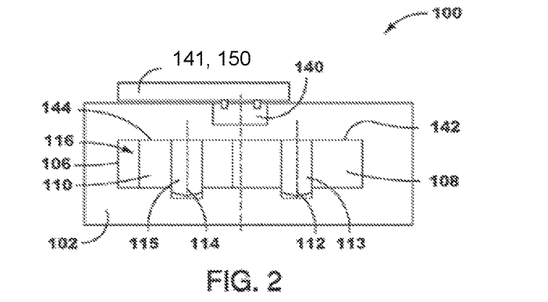
FIG. 2 is a cross-sectional side view of the fluid flow meter taken along the sectional plane A-A illustrated in FIG. 1.

FIG. 2 is a cross-sectional side view of the fluid flow meter 100 taken along line A-A shown in FIG. 1. Oval gears 108 and 110 installed within the chamber 106 defined by housing 102 and may be configured to rotate about axes 113 and 115, respectively. In the illustrated embodiments, fluid flow meter 100 may include flow sensor 140 and controller 141. The flow sensor 140 may be in communication (e.g., electrically by way of connection 143, or wirelessly) with the controller 141. Flow sensor 140 may be configured to sense a detectable area 146 (not shown) provided on top surfaces 142 and 144 of oval gears 108 and 110, respectively. For example, flow sensor 140 may be a magnetic sensor configured to sense a detectable area 146 comprising a magnet installed on or within at least one of the oval gears 108. In another example, flow sensor 140 may be an optical sensor configured to emit a wavelength onto at least one top surface 142 or 244 of the oval gears 108 including a detectable area 146 and sense a reflectance of the wavelength off at least one of the top surfaces 142. U.S. Pat. No. 7,523,660, filed Dec. 19, 2007, and U.S. Pat. No. 8,069,719, filed Feb. 11, 2009, provides examples of oval gears 108 incorporating non-contact sensors, the entire disclosure of each is hereby incorporated herein by reference. It can be appreciated that fluid flow meter 100 may include any number of non-contact sensors and any number of detectable areas suitable for a particular application of the meter. Flow sensor 140 may also be configured to generate a detection signal based on the detection, or lack of detection, of a detectable area 146.

Fluid flow meter 100 may also include controller 141 configured to calculate a volume of fluid flow through the meter based on the detection signal of flow sensor 140. The controller 141 may be configured to receive a detection signal of flow sensor 140 and generate input pulses to correspond to the rotation of the oval gears 108 based on the detection signal. The controller 141 can be a programmable computer such as a microprocessor, a programmable logic controller 141, and the like, and can include (and/or be in communication with) non-transitory storage media (e.g., a non-transitory storage medium 150) for storing instructions in the form of algorithms and/or data (e.g., calibration data). While an electrical connection 151 between the controller 141 and a non-transitory storage medium 150 is illustrated, it should be understood that the wireless connections between the controller 141 and the non-transitory storage medium 150 are contemplated. Further, it should be understood that while the electrical connections of the controller 141, non-transitory storage medium 150 and the fluid flow meter 100 are illustrated as being outside the housing 102 of the fluid flow meter 100 in FIG. 1, in FIG. 2, the controller 141 and the non-transitory storage medium 150 (along with associated connections) are housed within the housing 102 of the fluid flow meter 100 (as shown in FIG. 2). As will be discussed further herein, a volume of fluid passing through the fluid flow meter 100 may be calculated when the number of rotations (complete and partially complete) made by the oval gears 108 is known and a volume of fluid per rotation is known. Accordingly, controller 141 may be able to measure a volume of fluid passing through the meter based on the input pulses generated by the controller 141. In such cases, controller 141 may include a non-transitory storage medium 150 that stores a calibration between input pulses generated and volume of fluid passing through the fluid flow meter 100.

Figure 3A:
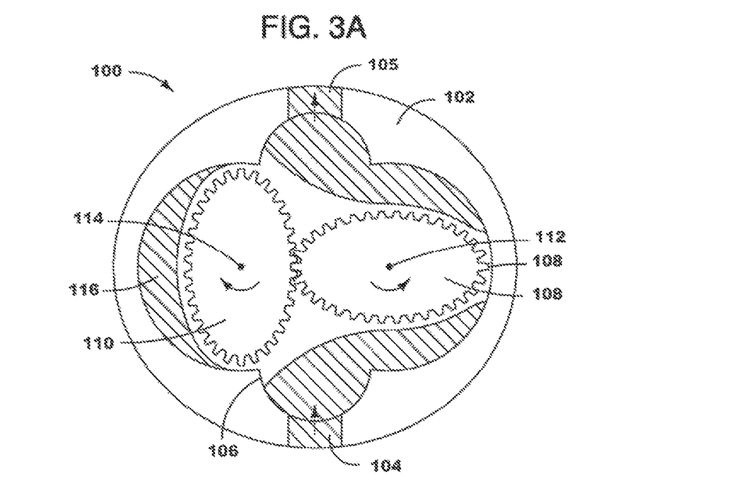
FIG. 3A is a sectional-plan view illustrating fluid flow through the fluid flow meter at a first rotational position of the oval gears.
Figure 3B:
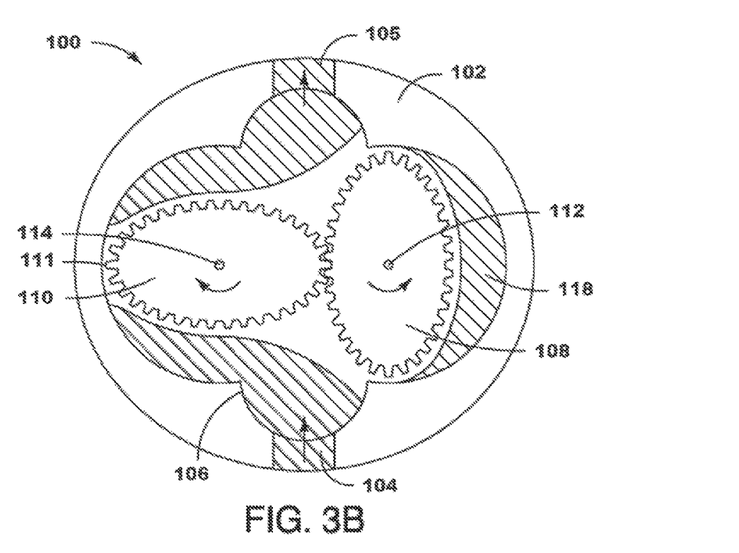
FIG. 3B is a sectional-plan view illustrating fluid flow through the fluid flow meter at a second rotational position of the oval gears.

FIGS. 3A and 3B are sectional-plan views illustrating fluid flow through the fluid flow meter 100. As seen therein, oval gears 108 and 110 are configured to intermesh thereby reducing the chances of fluid from fluid inlet 104 to pass between the gears. Accordingly fluid flows around the oval gears 108 by way of fluid pockets 116 and 118. FIG. 3A shows fluid flow meter 100 in a first rotational position where in fluid may be introduced into chamber 106 through fluid inlet 104. As noted above, the intermeshing of oval gears 108 and 110 reducing the chances of fluid from passing in between the gears thereby forcing the incoming fluid towards a vertex 109 of oval gear 108 and urging oval gear 108 to rotate in a counter-clockwise direction. The counter-clockwise torque applied across oval gear 108 in turn urges the clockwise rotation of oval gear 110.

FIG. 3B shows fluid flow meter 100 in a radially advanced rotational position relative to the rotational position shown in FIG. 3A, wherein oval gear 108 has rotated 90 degrees counter-clockwise and oval gear 110 has rotated 90 degrees clockwise. In this rotational position of fluid flow meter 100, the rotation of oval gear 108 has formed fluid pocket 118 defined by the surface of oval gear 108 and a wall of chamber 106. Concurrently, fluid from fluid inlet 104 is forced toward a vertex 111 of oval gear 110 thereby urging oval gear 110 to rotate in a clockwise direction. This in turn urges oval gear 108 to continue rotation in a counter-clockwise direction to release the fluid in fluid pocket 118.

It can be appreciated that a similar fluid pocket 116 may be formed between oval gear 110 and a wall of chamber 106, as shown in FIG. 3A.

Fluid flow meters according to the present embodiments may be configured to increase the resolution of measurement thereby allowing a more precise measurement of fluid flow through the meter. These configurations may be useful in low fluid flow applications. In one example, the fluid flow meter 100 may be configured measure half rotations of the oval gears 108 which correspond to a volume equal to the volume of two fluid pockets 116. In another example, the fluid flow meter 100 may be configured to measure quarter rotations of the oval gears 108 which correspond to a volume equal to one fluid pocket 116. The resolution of measurement of fluid flow meter 100 may also depend on the volume of fluid pockets 116 of the meter. Generally, fluid pockets 116 with a smaller volume may increase the measurement resolution of an oval gear 108 as smaller volumes of fluid are dispensed per rotation of the oval gears 108. Conversely, larger fluid pockets 116 may decrease the resolution as larger volumes of fluid are dispensed per rotation. It can be appreciated that different applications may require a different measurement resolution and examples of the present application may be configured to have a wide range of resolutions.

Figure 4A:
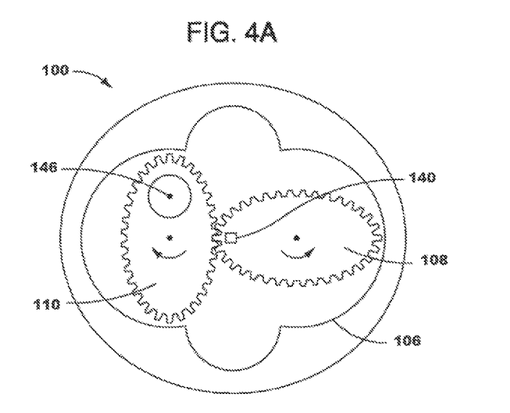
FIG. 4A is another sectional-plan view illustrating the fluid flow meter with non-contact sensors.

FIG. 4A is a sectional plan view of the fluid flow meter 100 including a flow sensor 140 and a detectable area 146. Flow sensor 140 may be configured to sense detectable area 146 provided on a surface of oval gear 110 and generate a detection signal. Flow sensor 140 may be mounted in a housing (102, not shown in FIG. 4A) of fluid flow meter 100 positioned above the top surfaces 142, 144 of oval gears 108 and 110. As indicated in FIG. 4A oval gear 108 and 110 are configured to rotate counter-clockwise and clockwise, respectively, in response to fluid flow through chamber 106. The rotation of oval gear 110 causes detectable area 146 to pass through a sensing region of flow sensor 140 that may be located underneath the sensor. Upon sensing detectable area 146, flow sensor 140 may generate a detection signal. Thus, a detection signal of flow sensor 140 may be indicative of a rotational position of oval gears 108 and 110 wherein detectable area 146 is underneath flow sensor 140. In this example, flow sensor 140 may be configured to generate a "positive" signal (hereinafter also referred to as "1" or "high") when the sensor senses the detectable area 146 and a "negative" signal (hereinafter also referred to as "0" or "low") when the sensor does not sense the detectable area 146. It can be appreciated that the detection signal generated by a flow sensor 140 may be of any form in any format suitable for indicating a sensing of a detectable area 146. In certain examples, a flow sensor 140 may be configured to not generate a detection signal when a detectable area 146 is not sensed. In such an example, the lack of a signal may still be indicative of a rotational position wherein the detectable area 146 is not within a sensing region of the sensor. As described previously, the fluid flow meter 100 may include a controller 141 configured to generate a pulsed output based on the detection signal provided by flow sensor 140. In this example, fluid flow meter 100 is configured such that rotation of oval gears 108 and 110 may cause flow sensor 140 to sense detectable area 146. Thus, the controller 141 may be configured to generate a pulse in response to the detectable area 146 being sensed by the flow sensor 140, as will be described further below.

Figure 4B:
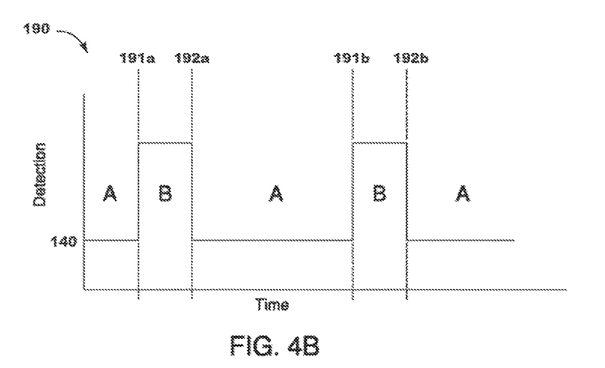
FIG. 4B is a schematic illustrating detection signals generated by the non-contact sensors shown in FIG. 4A.

FIG. 4B is a plot 190 of a detection signal of flow sensor 140 of fluid flow meter 100 over time according to an example. More specifically, plot 190 shows the detection signal of flow sensor 140 sensing detectable area 146 as oval gears 108 and 110 rotate in a forward direction in response to fluid flow through the meter. Plot 190 includes time points 191 *a*, 491 *b*, 492 *a* and 492 *b*. Initially, the detection signal of flow sensor 140 is low indicating that oval gears 108 and 110 are in a rotational position wherein the detectable area 146 is not within a sensing region of the sensor. The detection signal is high between time points 191 *a* and 192 *a*, and also 191 *b* and 192 *b*, and is indicative of rotational positions of the oval gears 108 wherein the detectable area 146 is sensed by flow sensor 140. The detection signal becomes low again between time points 192 *a* and 191 *b*, and also after time point 192 *b*, and is indicative of rotational positions of the oval gears 108 wherein the detectable area 146 is not sensed by the sensor. The time period between time points 181 *a* and 181 *b*, or alternatively, 182 *a* and 182 *b*, may represent all the rotational positions in one full rotation of oval gears 108 and 110 as there is a single detectable area 146 in fluid flow meter 100. Additional or fewer rotational positions and/or detectable areas are contemplated within the scope of the present disclosure (and as will be described further below).

In this example, the rotational positions of the oval gears 108 in one full rotation of fluid flow meter 100 may be categorized into rotation states A and B. Rotation state A comprises all the rotational positions wherein detectable area 146 is not sensed by flow sensor 140 and is shown in plot 190 before time point 191 *a*, between time points 192 *a* and 191 *b*, and also after time point 192 *b*. Rotation state B comprises all the rotational positions wherein the detectable area 146 is sensed by the flow sensor 140 and is shown in plot 190 between time points 191 *a* and 192 *a*, as well as 191 *b* and 192 *b*. When flow sensor 140 senses rotation state A and B, it generates a negative and positive detection signal, respectively. In such examples, the fluid flow meter 100 may include a controller 141 configured to calculate a volume of fluid flow through the meter by based on the detection signals provided by flow sensor 140. As oval gears 108 and 110 rotate in a forward direction in response to fluid flow through the meter, the gears eventually reach a rotational position wherein detectable area 146 is within a sensing region of the flow sensor 140. Accordingly, flow sensor 140 may sense rotation state B. It can be appreciated as the oval gears 108 continue to rotate in fluid flow meter 100, flow sensor 140 senses a sequence of rotation states comprising rotation state A and B, in order. As noted above, flow sensor 140 may be configured to generate a negative detection signal and a positive detection signal when rotation state A and B are sensed, respectively, and provide the signals to controller 141.

Concurrently, controller 141 of fluid flow meter 100 is configured to receive the detection signal from flow sensor 140 and produce a pulsed output. Upon receiving a detection signal indicative of both a rotation state and a rotational position of oval gears 108 and 110, the controller 141 determines in step 187 whether the detection signal is positive. If the detection signal is positive then the controller 141 may generate one or more input pulses and returns back to receiving state 186. If the detection signal is negative, then the controller 141 returns back to receiving state 186 without generating any input pulses. Referring back to FIG. 4B, it can be appreciated that input pulses can be generated by controller 141 at time points 191 *a* and 191 *b* when the detection signal goes from low to high. Alternatively, the controller 141 can be configured to generate input pulses when the detection signal goes from high to low (e.g., at time points 192 *a* and 192 *b*) by modifying step 187 to check to see if the detection signal is negative.

Embodiments described in FIGS. 1-4B can use algorithms that produce a pulsed output in response to the rotation of the oval gear 108 flow meter. For instance, in the embodiments described in FIGS. 1-4B, the controller 141 can be programmed with instructions that cause the controller 141 to generate a pulse. In such cases, the accuracy and resolution of the flow meter can be improved by generating input pulses that correspond to individual transition of the gears from a valid rotational state to another valid rotational state. FIG. 4C is a flow chart corresponding to one such algorithm 400.

Figure 4C:
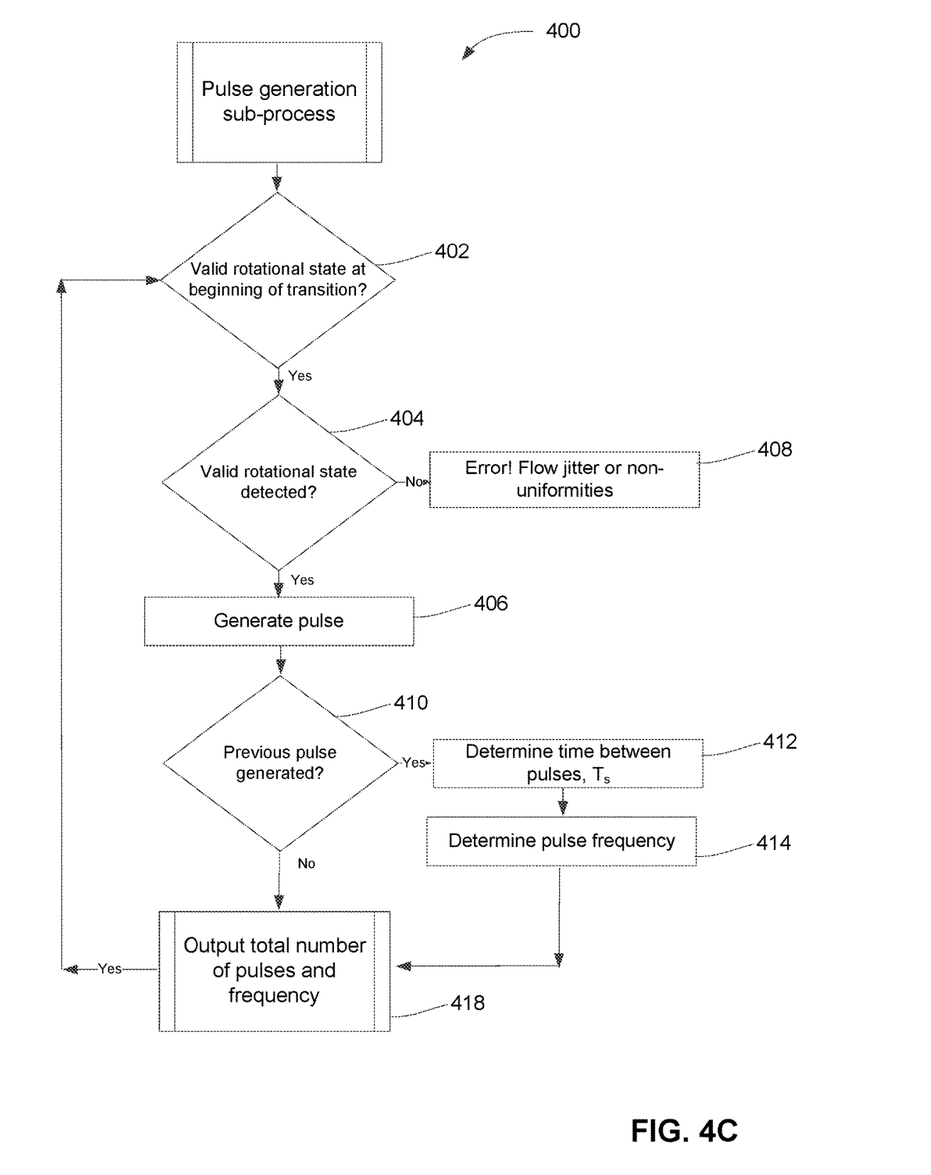
FIG. 4C is a schematic illustrating a pulse-generation method according to an embodiment.
Figure 4D:
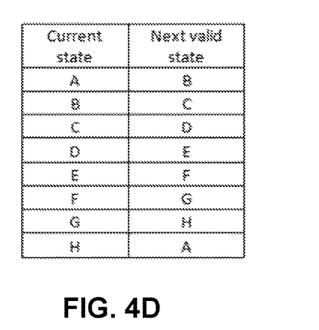
FIG. 4D is a schematic illustrating a sequence of valid rotational states of the oval gears of the fluid flow meter according to a non-limiting illustrative embodiment.

In the example illustrated in FIG. 4C, the oval gear 108 meter can have eight rotational states for every full rotation of the oval gears 108. For instance, the eight rotational states can be referred to as states A, B, C, D, E, F, G and H. FIG. 4D illustrates a chart that shows valid states in the sequence. In such cases, the controller 141 of the oval gear 108 meter can be programmed according to the algorithm of FIG. 4C, whereby the controller 141 is configured at step 402 to determine if the rotational state detected (e.g., by the flow sensor 140) is a valid rotational state. The controller 141 is then configured to determine (at step 404) if the oval gears 108 transition from a valid rotational state to another valid rotational state, according to the chart 4D. If for instance, the oval gears 108 transition from state A to state B, the controller 141 is configured to determine that the transition is valid, and generate a pulse at step 406. If on the other hand, the controller 141 determines that the transition is invalid (for instance, a state other than the states listed in right column of FIG. 4D for each corresponding state), then the controller 141 may not generate a pulse (corresponding to an error condition 408). Accordingly, in this example, the controller 141 will be configured to generate eight input pulses for a full rotation of the gears, corresponding to eight valid transitions between rotational states. While eight valid rotational states are illustrated, it should be noted that additional or fewer rotational states (corresponding to additional or fewer transitions and input pulses) respectively are contemplated within the scope of the present disclosure. Such embodiments facilitate accuracy of measurement and eliminate errors in measurement due to flow non-uniformities (such as jitter or backflow).

In certain embodiments, the controller 141 is configured to generate input pulses of duration shorter than time for transition from a valid rotational state to the next valid rotational state. In such cases, if the gears rotate "n" rotations per second, with "m" valid rotational states, a maximum time taken by the oval gears 108 to transition from a valid rotational state to the next valid rotational state is given by:

$$T_{transition} = \frac{1}{m \times n}$$

In such cases, the controller 141 can be configured to set generate pulses having an input pulse duration ($T_{pulse}$) less than the transition time from a valid rotational state to the next valid rotational state:

$$T_{pulse} < T_{transition}$$

Such embodiments may facilitate in an accurate input pulse count by reducing any overlap that may occur between transition of gears into one or more rotation states and input pulse generation. In operation, each time the oval gears 108 transition from a valid rotational state to another valid rotational state, the controller 141 generates an input pulse having input pulse duration $T_{pulse}$. The time interval between adjacent pulses can be $T_s$. In such cases, an input pulse frequency $F_s$ can be defined, whereby the input pulse frequency is the inverse of the time interval of adjacent input pulses:

$$F_S = \frac{1}{T_S + T_{pulse}}$$

In the illustrated example, the fluid flow meter 100 has eight valid rotational states (as illustrated in FIG. 4D). If, for instance, the oval gears 108 have 100 rotation per second, the transition time from one rotational state to next about 1.25 milliseconds in accordance with the above-expression. Accordingly, the controller 141 may generate input pulses having a duration of between about 0.1 and about 0.5 ms. More generally, the input pulse duration ($T_{pulse}$) can be between about 5% and about 50% of the transition time ($T_{transition}$).

Referring again to FIG. 4C, the controller 141 may check, at step 410 if previous input pulses were generated. In such cases, the controller 141 may determine, at step 412, the time interval between adjacent input pulses, $T_s$ and frequency $F_s$ at step 414. At step 416, relevant data, such as input pulse count, time interval between input pulses and/or the frequency.

While the examples below relate to the illustrated fluid flow meter 100 of FIGS. 1-4B, it should be understood the examples described herein would apply to other types of positive displacement meters that produce a pulsed output. In some such example embodiments, the controller 141 can generate input pulses in response to the passage of the quantity of fluid through the flow chamber 106, and/or the displacement of rotating components of the fluid flow meter 100. For instance, the controller 141 can generate input pulses in response to the synchronous rotation of the first gear and the second gear as detected by the non-contact sensors. The controller 141 can also be configured to determine the input pulse frequency $F_s$ for a wide range of known operating conditions and volumetric flow rates to establish calibration data that can be stored in the non-transitory storage medium 150.

In certain embodiments, the fluid flow meter 100 can be calibrated by supplying a known quantity of fluid therethrough, and determining the number of pulses N for a known quantity (e.g., volume V) of fluid. Such methods can be referred to herein as "factory calibration."

In some embodiments, flow meters typically have a flow range (e.g., between a flow maximum and flow minimum) over which accuracy of measurements can be guaranteed. At flow rates less the flow minimum, the flow meter may not produce any input pulses, but may still have flow through various mechanical components of the flow meter. Similar issues may occur at operation near the flow maximum. Further, based on manufacturing tolerances, individual pulse rate may have variations from nominal value of pulse rates. Pulse rate variability for different flow meters can be compensated using individual pulse rates received during factory calibration. A factory measured pulse rate can be included in documentation accompanying the flow meter, or advantageously, saved in the flow meter's data storage medium. Pulse rates, in some embodiments, may have non-integer values (e.g., 0.166 ml/pulse, 0.333 ml/pulse, etc.). Conventional flow meters may therefore have measurement uncertainties that may not be easily quantifiable.

Accordingly, in some such embodiments, advantageously, the fluid flow meter 100 can provide normalized output pulses that take into account variability in factory calibration due to manufacturing tolerances, and the like. In one aspect, the fluid flow meter 100 can include a controller 141 can generate input pulses (e.g., at an input pulse generator 160) in response to the receiving a signal (such as a detection signal) from a flow sensor 140 (e.g., non-contact sensors described above). Examples of flow sensors are described in the commonly assigned U.S. Pat. No. 9,383,235, the entire disclosure of which is hereby incorporated by reference. As described therein, several types of optical or magnetic flow sensors can be used. As described above, in some such cases, the flow sensor 140 may only generate a detection signal if the rotation of the gears corresponds to one of the predetermined valid rotational states.

In certain exemplary embodiments, the fluid flow meter may linearize the input pulses as described in U.S. patent application Ser. No. 15/658,435, filed Jul. 25, 2017, titled "Fluid Flow Meter with Linearization," the entire contents of which is hereby incorporated by reference.

Figure 5:
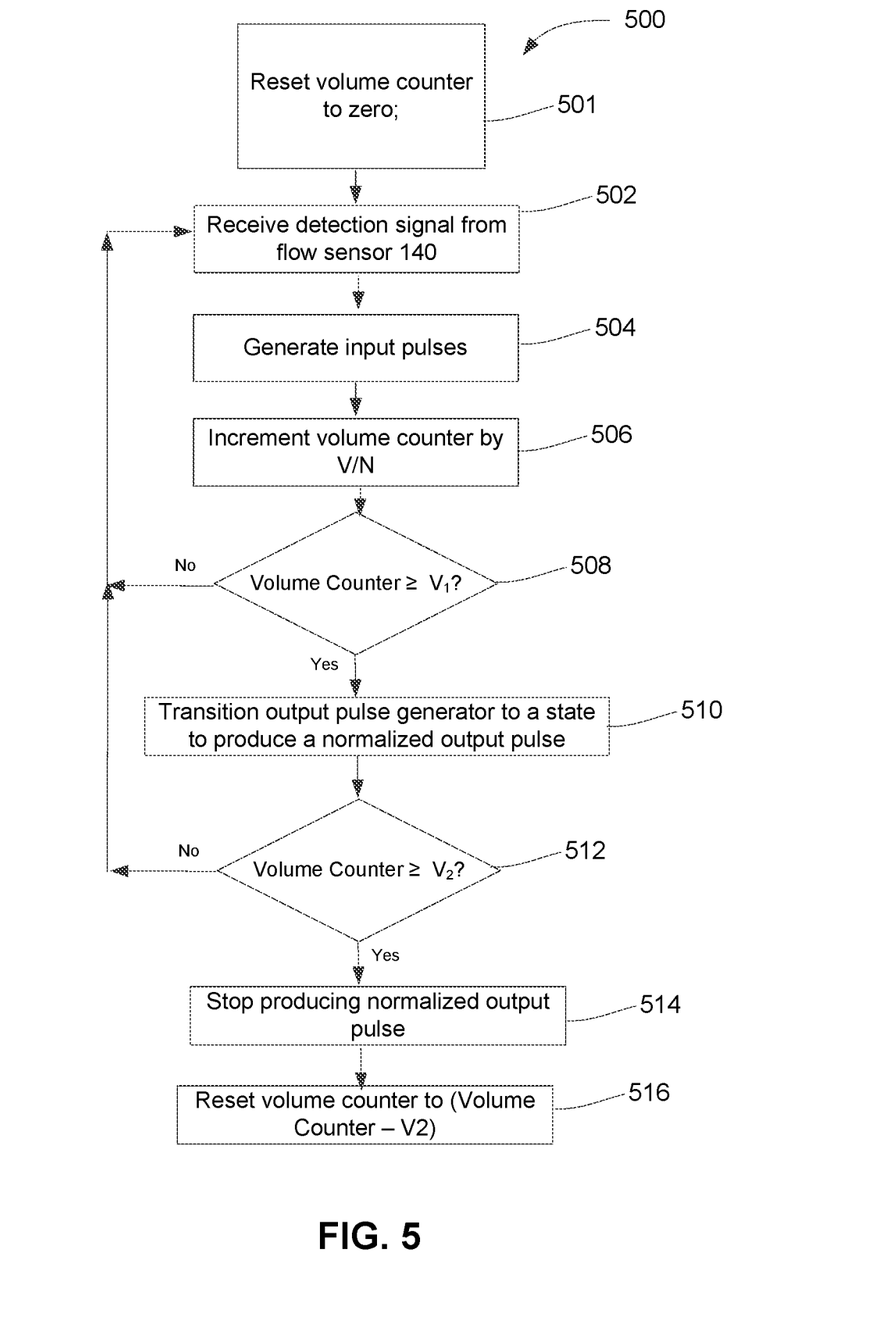
FIG. 5 is a flow chart illustrating an exemplary normalization algorithm.

In certain embodiments, the controller 141 of the fluid flow meter 100 can normalize the input pulses according a predefined algorithm. FIG. 5 illustrates one such normalization algorithm 500 by which the controller 141 normalizes the input pulses. At step 502, the controller 141 may receive a detection signal from the flow sensor 140 (e.g., when the flow sensor 140 has detected a valid rotational state). The controller 141 (e.g., a PLC or a microprocessor) can be programmed to generate input pulses at step 504 in response to the detection signal received from the flow sensor 140. A volume counter, initially reset to zero (e.g., at step 501) can be incremented at step 506 from zero to a value equal to a volume per input pulse. For every input pulse generated, the volume counter is incremented by a value equal to the volume per input pulse. For instance, this value may be stored in the non-transitory data storage medium connected to (or provided within) the controller 141, and may be retrieved therefrom.

The controller 141 continues generating input pulses and incrementing the volume counter each time an input pulse is generated and determines, at step 508 if the volume counter is equal to a first reference volume $V_1$. The controller 141 does not initiate a normalized output pulse until volume counter reaches or exceeds a first reference volume $V_1$. When the volume counter is determined to be equal to or greater than the first reference volume $V_1$, at step 510, the controller 141 is configured to transition a normalized output pulse generator 162 to a state whereby a normalized output pulse is generated. The normalized output pulse is generated for a duration until the volume counter reaches or exceeds a second reference volume $V_2$. In the meantime, the controller 141 determines, at step 512, if the volume counter reaches or exceeds a second reference volume $V_2$. Once the volume counter is equal to or greater than a second reference volume $V_2$, at step 514, the controller 141 transitions the normalized output pulse generator 162 back to a state where it does not generate normalized pulse and, at step 516, resets the volume counter to a value that equals the difference between the current value of the volume counter and the second reference volume (Volume Counter—$V_2$).

Figure 6:
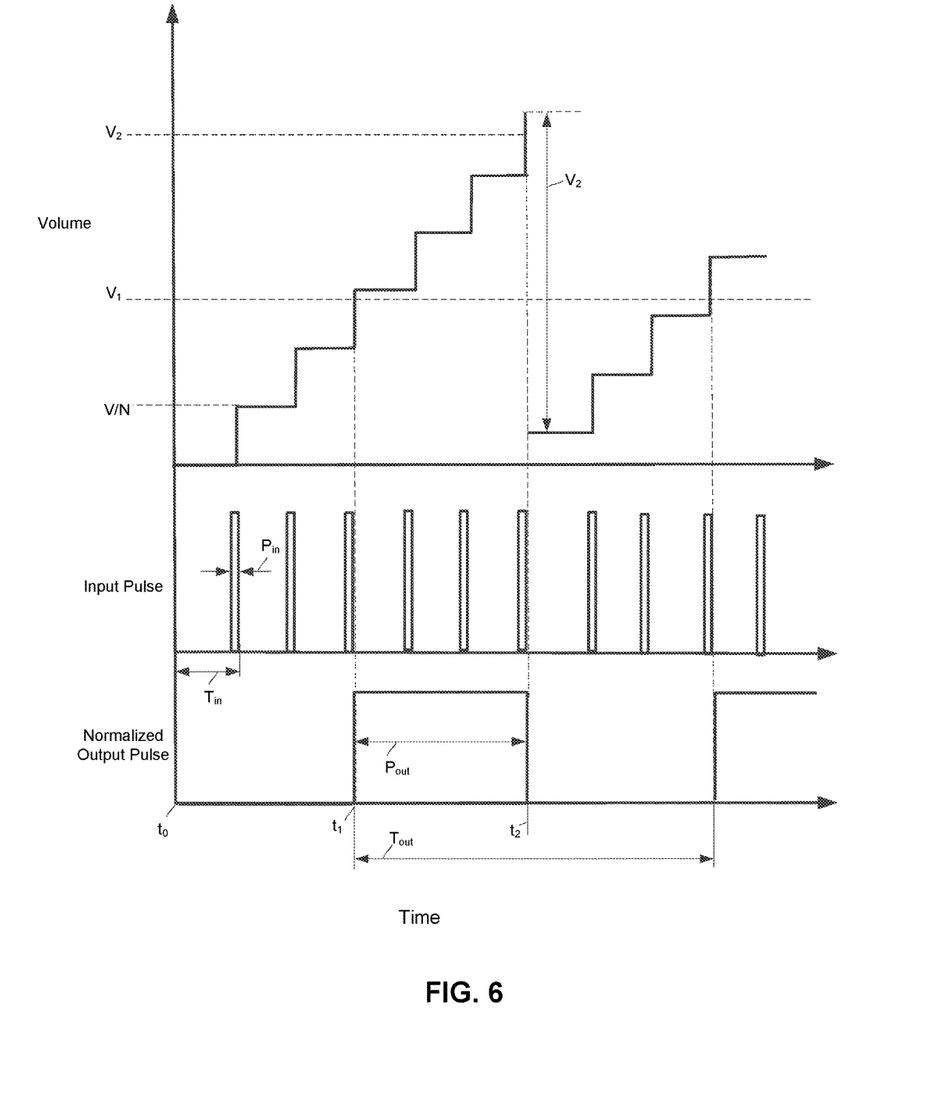
FIG. 6 is an illustrative example of normalized output pulses generated according to an embodiment along with input pulses illustrated for comparison.

As is apparent, the algorithm described above is configured such that the normalized output pulses have predefined characteristics. FIG. 6 illustrates certain characteristics of the normalized output pulses generated by the normalized output pulse generator 162. Also shown in FIG. 6 are characteristics of the input pulses. As seen therein, the normalized output pulse generator 162 is configured such that a frequency of normalized output pulses is less than a frequency of the input pulses. In some such cases, the normalized output pulse generator 162 can generate a single output pulse for every "N" input pulses, whereby N is an integer greater than one. In the illustrated example of FIG. 6, the input pulse generator 160 generates five or six pulses over a time interval $T_{out}$. In the same interval, the normalized output pulse generator 162 generates a single normalized output pulse. A duty cycle for input pulses is expressed as a ratio of input pulse duration and the time period of input pulses, $P_{in}/T_{in}$. The duty cycle for input pulses may depend on volume flow rate as the volume flow rate may change the time period between the input pulses. The duty cycle for input pulses may accordingly vary from 0.1% to 50%. As is apparent, the duty cycle for the normalized output pulse corresponds to a ratio of output pulse duration and time period of output pulses, $P_{out}/T_{out}$, as illustrated in FIG. 6. The duty cycle for output pulses may depend on reference volumes $V_1$ and $V_2$. In some non-limiting exemplary embodiments, when $V_2$ is approximately equal to $2V_1$ the duty cycle for output pulses may vary from 30% to 70%.

In some such embodiments, the controller 141 can transition the normalized output pulse generator 162 from a state where the normalized output pulse generator 162 generates a normalized output pulse for a duration corresponding to approximately one-half of a pulse cycle, so as to provide approximately 50% duty cycle for normalized output pulses. As seen from FIG. 6, in one example, the normalized output pulse generator 162 may not generate any pulses for the first half of the time period $T_{out}$ until time $t_1$ is reached. At this time, the volume counter exceeds the first reference volume $V_1$, and the normalized output pulse generator 162 generates an output pulse over the second half of the time period $T_{out}$ until time $t_2$. At time $t_2$, the normalized output pulse generator 162 is transitioned again to a state where normalized output pulses are not generated, and the volume counter is reset to a value equal to (Volume counter—$V_2$). Subsequent generation of normalized output pulses may not occur until the volume counter reaches first reference volume $V_1$ again.

In the illustrated embodiments, while a single normalized output pulses for five or six input pulses is illustrated, other suitable and convenient values of the normalized output pulses can be used. Further, as is apparent, instead of five or six input pulses, the input pulse generator 160 can generate other values of input pulses depending on relative values of the calibration, and the first and second reference volumes.

With continued reference to FIGS. 5 and 6, and as briefly described above, the controller 141 can increment a volume counter each time an input pulse is generated. Further, the controller 141 can determine whether the volume counter corresponds to the first reference volume $V_1$. If the volume counter corresponds to the first reference volume $V_1$, the output pulse generator is can generate a single normalized output pulse until the volume counter corresponds to the second reference volume $V_2$. When the volume counter exceeds the second reference volume $V_2$, the controller 141 can reset the volume counter to a value equal to (Volume Counter—$V_2$) and transition the output pulse generator to a state where the output pulse generator does not generate any pulses. The controller 141 can, in a subsequent pulse cycle, transition the output pulse generator to a state where it generates a subsequent normalized output pulse when the volume counter subsequently reaches first reference volume $V_1$.

As described previously, the algorithm shown in FIG. 5 can permit normalizing the input pulses such that a normalized output pulse is correlated to an integer value of volume. For example, the input pulses can be normalized such that volume per normalized output pulse is an integer. In such cases, as is apparent, the volume per input pulse is a non-integer and/or fractional value. This may occur, for instance, when a volume passing through the fluid flow meter 100 per input pulse is a non-integer value.

As is apparent, from the above discussion, the second reference volume $V_2$ in the algorithm of FIG. 5 corresponds to the integer value of volume per normalized output pulse. As described previously, the normalization algorithm 500 may result in a 50% duty cycle. In such cases, the first reference volume $V_1$ can be one-half of the second reference volume $V_2$. In some such examples, the controller 141 can increment the volume counter by non-integer values of volume per unit input pulse (which may be stored in a non-transitory storage medium 150 connected to the controller 141).

Continuing with the foregoing description, according to an example normalization algorithm 500, a volume corresponding to normalized output pulse can be M milliliters. If a near 50% duty cycle were desired, as seen in FIG. 6, the first reference volume $V_1$ can then be M/2 milliliters, and the second reference volume $V_2$ can be M milliliters. If a convenient value of volume per normalized output pulse is desired, then, the volume M per normalized output pulse can be an integer (e.g., 1 milliliter, 2 milliliters and the like). Further, M can be a non-zero integer greater than or equal to one. As is apparent, volume per input pulse, in such examples may not necessarily be an integer.

Referring again to FIG. 5, in some examples, the controller 141 may increment the volume counter by a non-integer value. As is apparent, in some such examples, the volume counter may be incremented by an amount equal to about the volume per input pulse, V/N, each time an input pulse is generated.

In some embodiments the fluid flow meter 100 may have two signal lines. A first signal line can be for input pulses generated by controller for each valid rotational state and a second signal line can be for normalized output pulse signals. Such embodiments can allow monitoring and evaluation of uniformity of gear rotation for constant flow and for pulsing flow, for instance, as seen in diaphragm pumps.

In certain embodiments, the fluid flow meter 100 has measurement uncertainties that are easily quantifiable. For instance, the fluid flow meter 100 can have a measurement accuracy of approximately $+/-\Delta V$ milliliters. In some such cases $\Delta V$ is approximately equal to the first reference volume $V_1$. Further, as is apparent from the preceding embodiments, in some cases, the fluid flow meter 100 can have a minimum measurable flow of approximately the first reference volume $V_1$. Accordingly, a measurement resolution of the fluid flow meter 100 is approximately equal to the first reference volume $V_1$.

In some examples, the user may rely on the flow per normalized output pulse as the "calibration" of the fluid flow meter 100, and in turn, rely on the counted normalized output pulses to determine the volume of an unknown quantity of fluid passing through the fluid flow meter 100. For instance, if the flow per normalized output pulse is a convenient value such as 1 milliliter per output pulse, 2 milliliter per output pulse, and the like, the user may simply count the number of normalized output pulses, and then use the flow per normalized output pulse to determine the volume. Advantageously, the flow per normalized output pulse may also be stored in the non-transitory storage medium 150 coupled to the fluid flow meter 100's controller 141.

In the illustrative example of FIG. 6, the input pulse generator 160 can generate six pulses for every one milliliter of flow through the fluid flow meter 100. Thus, according to some examples, the volume per input pulse is about 0.167 milliliters. When the output pulses are normalized according to certain embodiments of the present disclosure the normalized output pulse generator 162 is maintained at a state where it does not produce a pulse until the volume reaches 0.5 milliliters (for instance, over one half of the time period of output pulses). In some such examples, this may occur after three input pulses are generated by the input pulse generator 160. When the volume reaches 0.5 milliliters at the end of the first-half of the time period of output pulses, the normalized output pulse generator 162 can be transitioned to the second half period of output pulses until the volume reaches 1 milliliter at the end of the second-half duty cycle. Thus, the normalized output pulse generator 162 provides one pulse over a full period of output pulse and corresponding to 1 milliliter, and 0.5 milliliters corresponding to each half-period of output pulses.

In the example flow rate and normalized output pulse discussed above, the minimum flow detectable by the fluid flow meter 100 when relying on normalization of input pulses is about 0.5 milliliters. Accordingly, the measurement uncertainty can be quantified, in some examples as +/−0.5 milliliters.

Figure 7:
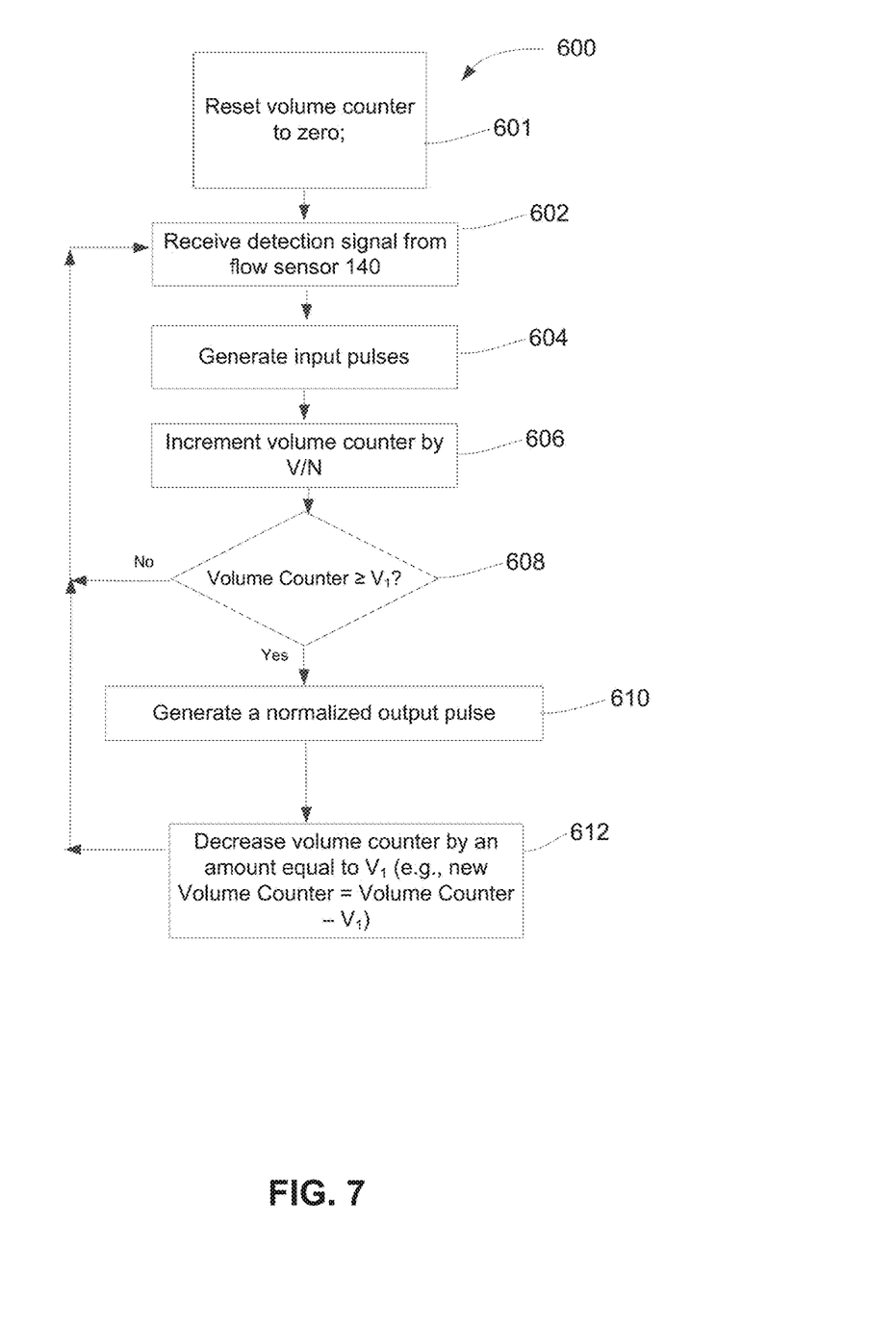
FIG. 7 is a flow chart illustrating another exemplary normalization algorithm.
Figure 8:
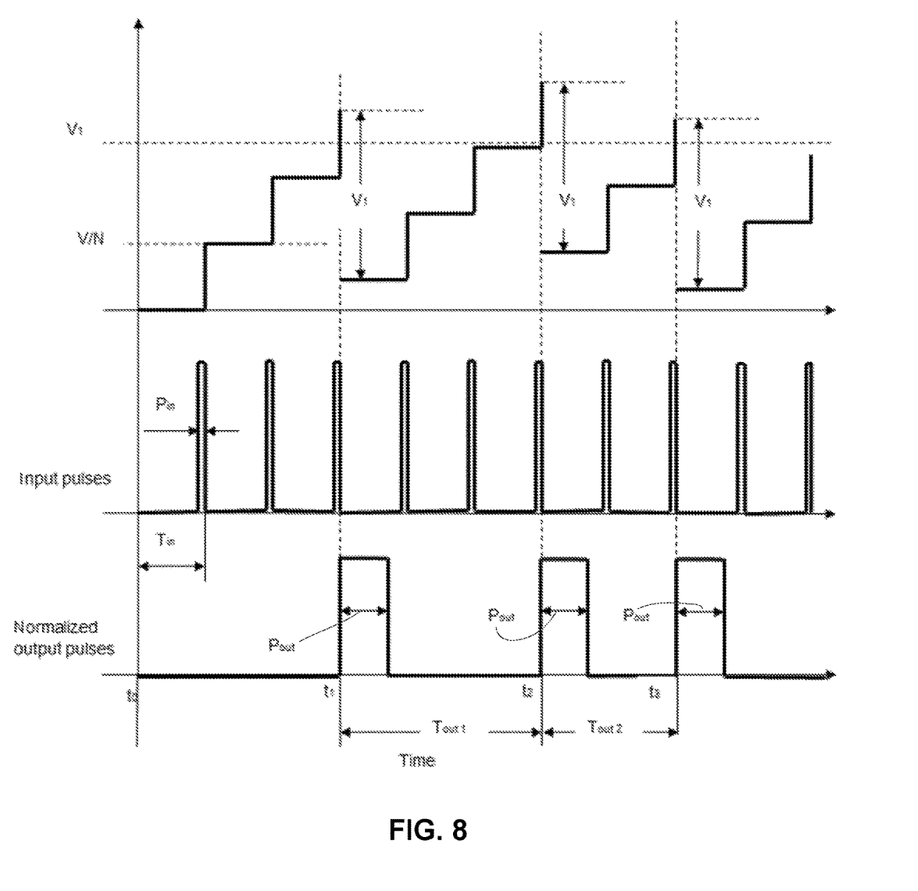
FIG. 8 is an illustrative example of normalized output pulses generated according to another embodiment along with input pulses illustrated for comparison.

In another non-limiting exemplary embodiment, the flow meter may have normalized output pulses with a constant pulse duration. FIGS. 7 and 8 illustrate respectively, an exemplary algorithm and a schematic of input and output pulses for such a variant of a flow meter. According to the algorithm 600 shown in FIG. 7 at step 601, the volume counter is set to zero. At step 602, the controller 141 may receive detection signal from the flow sensor 140. At step 604, input pulses may be generated. At step 606, the controller 141 may increment the volume counter by the calibration amount V/N, and at step 608, the controller can compare the volume counter with the first reference volume $V_1$. When at step 608, the volume counter equals or exceeds the first reference volume $V_1$, the controller 141, at step 610, generates a single normalized output pulse. After the normalized output pulse is generated the controller decreases the volume counter by an amount equal to the first reference volume $V_1$ and returns to step 602. For the subsequent cycles of input pulses, the volume counter is not set to zero.

Referring to FIG. 8, the normalized output pulse generated using the algorithm 600 (shown in FIG. 7) has a duration $P_{sel}$ which can be preselected from the controller 141's storage medium settings. Advantageously, to reduce errors at high flow rates, the pulse duration $P_{sel}$ can be chosen so as to be less than the lowest value of the time period $T_{in}$ corresponding to the maximum frequency of input pulses. Accordingly, the normalized output pulses shown in FIG. 8 can have a shorter duration than those illustrated in FIG. 6. As seen in FIG. 8, the number of input pulses required to generate consecutive normalized output pulses may be different because of variations in starting values of volume counter. Embodiments such as those illustrated in FIGS. 7 and 8 can provide improved resolution.

Advantageously, fluid flow meters with normalization of input pulses can provide convenient calibration values (e.g., integer values of volume per normalized output pulse). Further, the controller 141 can be programmed such that the duty cycles are normalized so that each half of the duty cycle corresponds to 50% of the volume, thereby providing a uniform normalized pulse output. Further, such embodiments also advantageously do not require a high-frequency pulse counter to count individual input pulses that are of shorter duration, relative to the normalized output pulse. Such embodiments also reduce the need for recalibration of the oval gear meter, and provide a conveniently normalized output that factors in variability in calibration due to manufacturing tolerances.

Various examples have been described. These and other examples are within the scope of the following claims.

The invention claimed is:

1. A fluid flow meter, comprising;
a flow chamber;
a first gear intermeshing with a second gear, the first gear and the second gear being positioned within the flow chamber, the intermeshing of the first gear and the second gear permitting synchronous rotation of the first gear and the second gear in response to flow of a fluid through the flow chamber;
a flow sensor configured to generate a detection signal in response to the passage of fluid through the flow chamber and/or synchronous rotation of the first gear and the second gear; and
a controller having an input pulse generator and a normalized output pulse generator, the controller being configured to
receive detection signal from the flow sensor,
cause the input pulse generator to generate input pulses when detection signal is received from the flow sensor,
increment a volume counter by an amount equal to a volume per input pulse each time an input pulse is generated,
transition the normalized output pulse generator from a state where the normalized output pulse generator does not generate output pulses to a state where the normalized output pulse generator starts generating a normalized output pulse when the volume counter exceeds a first reference volume, and
transition the normalized output pulse generator from a state where the normalized output pulse generator generates a normalized output pulse back to a state where the normalized output pulse generator stops generating the normalized output pulse.

2. The fluid flow meter of claim 1, wherein the controller is configured to decrease the volume counter by the first reference volume each time when or after the normalized output pulse is generated.

3. The fluid flow meter of claim 1, wherein the controller is configured to determine whether volume counter corresponds to the first reference volume, and if the volume counter corresponds to the first reference volume, the normalized output pulse generator is further configured to generate a single normalized output pulse until the volume counter corresponds to a second reference volume.

4. The fluid flow meter of claim 3, wherein, when the volume counter exceeds the second reference volume the controller is further configured to decrease the volume counter by the second reference volume.

5. The fluid flow meter of claim 4, wherein the controller is further configured to transition the normalized output pulse generator to a state where the normalized output pulse generator generates a subsequent normalized output pulse when the volume counter subsequently reaches first reference volume.

6. The fluid flow meter of claim 1, wherein a measurement accuracy of the fluid flow meter is +/−ΔV, whereby ΔV is approximately equal to the first reference volume.

7. The fluid flow meter of claim 1, wherein the controller is configured to transition the normalized output pulse generator from a state where the normalized output pulse generator generates normalized output pulses for a duration corresponding to one-half of a pulse cycle, such that the fluid flow meter has a duty cycle of 50% for normalized output pulse generation.

8. The fluid flow meter of claim 1, wherein the controller is configured to increment the volume counter by non-integer values each time an input pulse is generated.

9. The fluid flow meter of claim 1, further comprising a non-transitory data storage medium operatively connected to the controller, the non-transitory data storage medium being configured to store the non-integer value by which the volume counter is to be incremented when an input pulse is generated.

10. The fluid flow meter of claim 9, wherein the non-integer values correspond to a volume passing through the fluid flow meter when the flow sensor generates an input pulse.

11. The fluid flow meter of claim 1, wherein a measurement resolution of the fluid flow meter is approximately equal to the first reference volume.

12. A method of providing a normalized output for a fluid flow meter, comprising:
providing a fluid flow meter, comprising:
a flow chamber,
a first gear intermeshing with a second gear, the first gear and the second gear being positioned within the flow chamber, the intermeshing of the first gear and the second gear permitting synchronous rotation of the first gear and the second gear in response to flow of a fluid through the flow chamber,
a flow sensor, and
a controller having an input pulse generator and a normalized output pulse generator;
receiving a detection signal from the flow sensor;
generating, input pulses using the input pulse generator when a detection signal from the flow sensor is received by the controller;
increment a volume counter by an amount equal to a volume per input pulse each time an input pulse is generated;
transition the normalized output pulse generator from a state where it does not produce a normalized output pulse to a state where it starts producing the normalized output pulse when the volume counter exceeds a first reference volume; and
transition the normalized output pulse generator from a state where it produces the normalized output pulse to a state where it stops producing the normalized output pulse when the volume counter exceeds a second reference volume.

13. The method of claim 12, wherein a volume corresponding to normalized output pulse is M, the first reference volume is M/2, and the second reference volume is M.

14. The method of claim 12, wherein the flow sensor generates a detection signal when the rotation of the first gear and the second gear correspond to a predetermined valid rotational state.

15. A method of providing a normalized output for a fluid flow meter, comprising:

providing a fluid flow meter, comprising:
- a flow chamber,
- a first gear intermeshing with a second gear, the first gear and the second gear being positioned within the flow chamber, the intermeshing of the first gear and the second gear permitting synchronous rotation of the first gear and the second gear in response to flow of a fluid through the flow chamber, and
- a controller having an input pulse generator and a normalized output pulse generator;

generating input pulses using the input pulse generator when a non-integer value of volume passing through the fluid flow meter;

incrementing a volume counter by an amount equal to the non-integer value of volume passing through the flow meter when an input pulse is generated;

transitioning the normalized output pulse generator from a state where it does not produce a normalized output pulse to a state where it starts producing the normalized output pulse when the volume counter exceeds a first reference volume; and transitioning the normalized output pulse generator from a state where it produces the normalized output pulse to a state where it stops producing the normalized output pulse when the volume counter exceeds a second reference volume, whereby, the first reference volume is one-half of the second reference volume.

16. The method of claim 15, wherein the non-integer value is an average pulse rate for input pulses.

17. The method of claim 15, wherein the second reference volume is a non-zero integer.

18. The method of claim 15, wherein a frequency of normalized output pulses is less than a frequency of the input pulses.

19. The method of claim 15, wherein a frequency of normalized output pulses is less than a frequency of the input pulses.

* * * * *